US009267796B2

(12) United States Patent
Gusev

(10) Patent No.: US 9,267,796 B2
(45) Date of Patent: *Feb. 23, 2016

(54) DISTANCE MEASURING DEVICE
(71) Applicant: Trimble AB, Danderyd (SE)
(72) Inventor: Yuri P. Gusev, Alvsjo (SE)
(73) Assignee: Trimble AB, Danderyd (SE)
( * ) Notice: Subject to any disclaimer, the term of this patent is extended or adjusted under 35 U.S.C. 154(b) by 0 days.

This patent is subject to a terminal disclaimer.

(21) Appl. No.: 14/264,589
(22) Filed: Apr. 29, 2014
(65) Prior Publication Data
US 2014/0233012 A1 Aug. 21, 2014

Related U.S. Application Data

(63) Continuation of application No. 13/376,241, filed as application No. PCT/EP2009/058051 on Jun. 26, 2009, now Pat. No. 8,755,037.

(51) Int. Cl.
G01C 3/08 (2006.01)
G01S 7/489 (2006.01)
G01S 17/10 (2006.01)
G01C 15/00 (2006.01)

(52) U.S. Cl.
CPC ............... G01C 3/08 (2013.01); G01C 15/002 (2013.01); G01S 7/489 (2013.01); G01S 17/10 (2013.01)

(58) Field of Classification Search
CPC ......... G01S 17/10; G01S 7/497; G01S 17/89; G01S 7/487; G01C 3/08
USPC ........... 356/3.01, 3.09, 4.01, 4.07, 5.01, 5.09, 356/9, 625
See application file for complete search history.

(56) References Cited

U.S. PATENT DOCUMENTS 3,721,837 A * 3/1973 Trapani et al. ................ 327/195
4,498,764 A 2/1985 Bolkow et al.
(Continued)

FOREIGN PATENT DOCUMENTS

WO WO-2004057269 A1 7/2004
WO WO-2008/009387 A1 1/2008

OTHER PUBLICATIONS

International Search Report for International Application No. PCT/EP2009/058051 dated Jun. 26, 2009.

(Continued)

Primary Examiner — Luke Ratcliffe
Assistant Examiner — Samantha K Abraham
(74) Attorney, Agent, or Firm — Harness, Dickey & Pierce

(57) ABSTRACT

An optical device is disclosed that may be employed in distance measuring devices. In at least one embodiment, the optical device includes a control unit that is adapted to cause at least one control signal generator unit to generate at least one control signal according to a predetermined temporal function on the basis of an elapsed time from a predetermined point in time. On the basis of the generated at least one control signal, at least one parameter of a receiver unit may be adjusted during the travel time of the optical pulse, wherein the at least one parameter affects the dynamic range of the receiver unit. In this way, the dynamic range of the receiver unit may be increased. A method is further disclosed for operating such an optical device, along with a distance measuring device including such an optical device and a surveying instrument including such a distance measuring device.

20 Claims, 4 Drawing Sheets

(56) References Cited

U.S. PATENT DOCUMENTS

| | | | |
|---|---|---|---|
| 4,994,811 A * | 2/1991 | Moreira | 342/205 |
| 5,646,623 A * | 7/1997 | Walters | G01S 13/32 |
| | | | 342/112 |
| 5,656,623 A | 8/1997 | White et al. | |
| 5,877,851 A | 3/1999 | Stann et al. | |
| 7,911,589 B2 | 3/2011 | Siercks | |
| 2003/0103197 A1 | 6/2003 | Shirai et al. | |
| 2003/0175001 A1 | 9/2003 | Lawrence et al. | |

OTHER PUBLICATIONS

Office Action for Chinese Application No. 200980160000.5 dated Jan. 16, 2015.

Howard D. Krumboltz and Vincent M. Contarino, "An Optical Radar Receiver Using Programmed Sensitivity Time Control," Naval Air Development Center, Warminster, Pennsylvania, 18974, SPIE vol. 160, Ocean Optics V, 1978, pp. 184-188.

* cited by examiner

DISTANCE MEASURING DEVICE

This application is a Continuation of U.S. application Ser. No. 13/376,241 filed Dec. 5, 2011, which is a national phase under 35 U.S.C. §371 of PCT International Application No. PCT/EP2009/058051 which has an International filing date of Jun. 26, 2009; the entire contents of each of which are hereby incorporated herein by reference

TECHNICAL FIELD

The present invention generally relates to electronic distance measuring in range finding applications. In particular, the present invention relates to a distance measuring device and a surveying instrument comprising the same.

BACKGROUND

The art of surveying, or range finding, involves the determination of unknown positions, surfaces or volumes of objects using measurements of angles and distances. In order to carry out these measurements, an optical surveying instrument or geodetic instrument often comprises an electronic distance measuring (EDM) device which may be integrated in a so-called total station or a scanner. A distance measuring total station combines electronic and optical components and is furthermore in general provided with a computer or control unit with writeable information for controlling the measurements to be performed and for storing data obtained during the measurements. Preferably, the total station calculates the position of a target in a fixed ground-based coordinate system. A more detailed description of such a total station may be found in, e.g., WO 2004/057269 by the same applicant.

In conventional EDM, a light beam is emitted as a light pulse towards a target, and light reflected against the target is subsequently detected at the optical instrument, such as a total station. Processing of the detected signal enables determination of a distance to the target by means of, e.g., time-of-flight (TOF) or phase modulation techniques. Using a TOF technique, the time of flight of a light pulse that travels from the surveying instrument (the EDM device) to a target, is reflected at the target and returns to the surveying instrument (the EDM device) is measured, on the basis of which the distance may be calculated. The power loss of the received signal determines the maximum possible range. Using a phase modulation technique, light modulated at different frequencies is emitted from the surveying instrument to the target, whereby reflected light pulses are detected and the distance is calculated based on the phase difference between emitted and received pulses.

In a conventional scanner, the light beam may be guided over a number of positions of interest at the surface of the target using a beam steering function. A light pulse is emitted towards each of the positions of interest and the light pulse that is reflected from each one of these positions is detected in order to determine the distance to each one of these positions.

For example, using a LIDAR (Light Detection and Ranging) scanner, or an industrial scanner, properties of scattered light may be measured to find range and/or other information of a distant target. In general, the distance to an object or surface is determined using laser pulses or a phase modulation technique such as mentioned above.

The detected signal representative of a reflected light pulse, i.e. the return signal, may have a wide dynamic range. In other words, the strength or power (or the amplitude) of the return signal may vary significantly from one position to another. Variations of the strength of the return signal may be explained by, e.g., differences in reflectivity between different positions at the surface of the target and/or differences in the topography of the target. As a result, distances determined on the basis of a return signal having a too high or too low power may not be accurate because of difficulties in handling a wide dynamic range at the measuring device. The detected signal may, e.g., be saturated or subject to excessive noise or interference.

Thus, the amplitude of the return signal at the input of the readout electronics (i.e. components employed to register the reflected optical pulses) at the measuring device, such as an EDM device or a scanner, must be limited in order to avoid saturation of the readout electronics. For example, the dynamic range of high-speed A/D converters is normally limited to about 25 dB, while the variation of the amplitude of a signal detected at the measuring device may be considerably higher, e.g., about 60 dB-100 dB or higher.

In some conventional measuring devices, the problem of a wide dynamic range of the return signals have been addressed by ignoring measurements for which the strength of the return signal is above a first threshold or below a second threshold. However, this approach implies unnecessary processing of invalid measurements. Another approach, usually used in so called "rising edge" measurements, is to accept a certain distance measurement error—walking error—due to the large dynamic range, or try to compensate for it, which may be possible to some extent. Yet another approach has been to perform a two-step measurement for each of the target positions of interest. In the first step, a first light pulse, or a series of light pulses, is transmitted towards the target, and the reflected light pulse is detected and processed by the readout electronics to determine an appropriate gain for measurement at the respective position. Typically, in the first step, if the amplitude of the return signal is considered to be low (below a predetermined threshold), the gain is set to a value larger than 1. If the amplitude of the return signal is considered to be high (above a predetermined threshold), the gain is set to a value smaller than 1. Subsequently, in the second step, a second light pulse is emitted towards the target, and the reflected light pulse is detected and amplified using the gain set in the first step. The amplified signal is then processed for determining the distance to the target. In this way, the distance may be measured with an appropriate gain for each of the positions of interest. However, this approach provides a limited measurement rate, and thereby low overall efficiency.

Furthermore, conventional measuring devices directed toward allowing for a high dynamic range in pulses or signals detected at the input of the readout electronics are generally associated with high costs due to need for advanced, custom-designed components. Furthermore, such high-dynamic-range conventional devices generally are not capable of providing fast response times (e.g. of the order of 1 ns or less), which may be necessary for efficiently performing high-speed EDM or scanning (e.g. of such high speed as to enable accurate single shot measurements).

The difficulties in handling a wide dynamic range at the measuring device as discussed in the foregoing pertains to a number of applications, some of which have been mentioned in the foregoing, but may also be relevant for radar applications, etc.

There is thus a need in the art for an improved distance measuring device that addresses one or more of the above problems.

SUMMARY

In accordance with the above, an object of the present invention is to provide an improved distance measuring device.

Another object of the present invention is to provide an optical device having an improved dynamic range in the readout electronics.

Yet another object of the present invention is to provide a distance measuring device and/or an optical device that provide a high overall measuring efficiency.

Yet another object of the present invention is to provide a surveying instrument, such as a total station, that provides a high overall measuring efficiency.

Yet another object of the present invention is to provide a distance measuring device, a surveying instrument and/or an optical device that allow for cost-effective manufacturing thereof.

Still another object is to provide a receiver unit having an improved dynamic range in the readout electronics.

One or more of these and other objects are completely or partially achieved by an optical device, a method for operating an optical device, a distance measuring device, a surveying instrument and a receiver unit as defined in the independent claims. Additional embodiments are defined in the dependent claims, and further objects of the present invention will become apparent through the following description.

In the context of some embodiments of the present invention, the term "optical pulse", or "light pulse", refers to an optical output of an optical radiation source, irrespective of the optical radiation source emitting light pulses having short duration intended for e.g. time-of-flight distance measurements or emitting modulated continuous-wave optical radiation intended for e.g. phase difference distance measurements.

According to a first aspect of the present invention, there is provided an optical device comprising an optical radiation source arranged to emit optical pulses, a receiver unit arranged to receive reflected optical pulses, a time-measuring unit arranged to generate an elapsed time from a predetermined point in time. The optical device may further comprise at least one control signal generator unit and a control unit. The control unit may be adapted to cause the at least one signal generator unit to generate at least one control signal according to a predetermined temporal function on the basis of the elapsed time, and, on the basis of the generated at least one control signal, adjust at least one parameter of the receiver unit, the at least one parameter affecting the (output) dynamic range of the receiver unit.

Such an optical device may for example be utilized in EDM and/or in devices such as scanners and surveying instruments, e.g. total stations, wherein it advantageously is capable of substantially increasing the dynamic range at the receiver thus accommodating for relatively large variations in the amplitude of a pulse or signal detected at the measuring device (e.g., an EDM device or a scanner) while avoiding saturation of the readout electronics at the measuring device. Consequently, the problem of measurements involving return signals/pulses having a wide dynamic range, which may necessitate ignoring such measurements, may be alleviated or eliminated. Thereby, the measurement rate may be maintained or improved. At the same time, the measurement accuracy can be maintained. In this way, the overall efficiency of the optical device may be maintained or even increased.

In particular in EDM applications, such an optical device generally enables reducing the measurement time required for measuring at each point of interest, as well as increasing the scanning rate. Thereby, an improved resolution of scanned images may be achieved, as well as a decreased time required for on-site measurements. Furthermore, such an optical device is in general straightforward and cost-effective to manufacture, as it does not require any expensive, custom-made components. Hence, a high dynamic range of at the receiver may be reached without the need for advanced custom-designed components.

According to a second aspect of the present invention, there is provided a distance measuring device for measuring the distance to a target from the device, which distance measuring device comprises an optical device according to the first aspect of the present invention or embodiments thereof.

According to a third aspect of the present invention, there is provided a surveying instrument comprising a distance measuring device according to the second aspect of the invention or embodiments thereof.

According to a fourth aspect of the present invention, there is provided a method for operating an optical device comprising an optical radiation source arranged to emit optical pulses, a receiver unit arranged to receive reflected optical pulses, a time-measuring unit arranged to generate an elapsed time of at least one optical pulse, and at least one control signal generator unit, wherein the time-measuring unit is configured such that the elapsed time is generated from a predetermined point in time. The method comprises the steps of causing the at least one control signal generator unit to generate at least one control signal according to a predetermined temporal function on the basis of the elapsed time, and, on the basis of the generated at least one control signal, adjusting at least one parameter of said receiver unit, wherein the parameter affects the dynamic range of the receiver unit.

According to a fifth aspect of the present invention, there is provided a computer program comprising computer code arranged to perform a method according to the fourth aspect of the present invention or embodiments thereof.

According to a sixth aspect of the present invention, there is provided a computer readable digital storage medium on which there is stored a computer program comprising computer code arranged to perform a method according to the fourth aspect of the present invention or embodiments thereof.

According to a seventh aspect of the present invention, there is provided a receiver unit adapted to receive optical pulses. According to this aspect of the present invention, the receiver unit comprises components being associated with at least one parameter affecting the dynamic range of the receiver unit, and the receiver unit is adapted to be integrated in an optical device according to the first aspect of the present invention or embodiments thereof, or a distance measuring device according to the second aspect of the present invention or embodiments thereof, or a surveying instrument according to the third aspect of the present invention or embodiments thereof.

The predetermined point in time may comprise a point in time when at least one optical pulse was emitted.

Substantially concurrently with or in connection to with emission of at least one optical pulse from the optical radiation source, an optical reference pulse may be emitted that may be guided, e.g. internally with respect to the optical device, to the receiver unit. The predetermined point in time may comprise a point in time when the optical reference pulse is received at the receiver unit.

Embodiments of the present invention are based on the advantageous insight that the optical power of pulses or signals received at the input of the readout electronics of a receiver unit of an optical device, such as an EDM device, may be regulated in the time domain by means of a variable optical attenuator or amplifier, such as a doped fibre amplifier (e.g., an erbium-doped fibre amplifier, EDFA), or a variable electrical attenuator or amplifier after a photodetector. Alternatively or optionally, the responsivity or another parameter of the photodetector may be regulated in the time domain. For further clarifying this, the following exemplifying scenario may be considered.

Consider an optical radiation source emitting an optical pulse towards a reflecting target having a reflection coefficient $\alpha_r$, the target being located at a distance R from the radiation source, and a receiver unit having an aperture A. For simplicity but with no loss of generality, the optical radiation source has the same aperture A. The optical radiation source further comprises an optical system having some focal length. Both the radiation source and the receiver unit are placed substantially within the focus of the optical system.

Now assume that the optical radiation source emits an optical pulse having a peak power P, and further that the optical pulse is collimated by the optical system to a beam having some diameter. The optical pulse propagates from the radiation source to the target, from which the optical pulse reflects in an isotropic manner (i.e. all the optical power is reflected in an angle $2\pi$ srad), whereby a portion of the total reflected optical power $\alpha P$ is reflected back towards the receiver unit, either directly or via an optical system comprising one or more prisms, wave guides, etc. The optical power $P_r$ thus received at the receiver unit is inversely proportional to the square of the distance from the optical radiation source to the target; $P_r \sim \alpha P/R^2$, $\alpha$ being the albedo of the target (neglecting saturation effects due to the optical system and/or limited size of the aperture A of the receiver unit). As the speed of light is substantially constant in the air, the received optical power $P_r$ is also inversely proportional to the square of the travelling time of the optical pulse travelling from the optical radiation source to the target and back to the receiver unit, for a constant reflected power $\alpha P$. The reflected optical power $\alpha P$ is substantially independent of the distance R under the assumption that the optical pulse is collimated by the optical system to a beam. The reflected optical power $\alpha P$ is substantially independent of the distance R even in case the beam is divergent, as long as the effective area of the target on which the beam is incident is larger than the cross section of the beam.

In this manner, the received optical power $P_r$ may vary by several orders of magnitude during a typical travelling time of an optical pulse. Thus, on one hand, during a time immediately after the optical pulse has been emitted, the amplitude of a potential incoming optical pulse or signal may be very high. However, on the other hand, as time passes, the amplitude of a potential incoming optical pulse or signal may decrease by several orders of magnitude compared to during the time immediately after the optical pulse has been emitted.

Such a large amplitude variation is a substantial technical problem because a too high optical power received at the receiver unit may cause saturation at the receiver unit. As previously mentioned, to address this problem the optical power of optical pulses received at the receiver unit may be regulated in the time domain by means of a variable optical attenuator or a variable electrical attenuator or amplifier. Thus, the general principle of the present invention is to set the attenuation (or amplification) to a high (e.g., maximum) value (or a low [e.g., minimum] value), at the instant an optical pulse is emitted from the optical radiation source, and then as time passes decrease (or increase) the attenuation (or amplification) temporarily, e.g. until another optical pulse is emitted from the optical radiation source. The same principle is applicable to both an electrical attenuator and an optical attenuator. The above scenario does not take into account for the limited sensitivity of the receiver unit, diffraction effects in the optical system, etc. However, with respect to achieving the function of the present invention, such second-order effects in general merely cause negligible changes to the dependence of the received optical power $P_r$ on the distance R from the optical radiation source to the target (or the travelling time of the optical pulse).

Let us further formalize the description of the invention. The output signal from the optical receiver unit, that is the input signal to the read-out electronics, can be denoted as an input voltage $V_{ADC}$ at the A/D converter. This voltage is a function of the received optical power $P_r$ and the overall conversion gain of the receiver G. Since $P_r$ depends on the target albedo and the distance to the target, the voltage $V_{ADC}$ for a given albedo $\alpha$ can be written as $$V_{ADC}=V_{ADC}(\alpha,R)=P_r(\alpha,R)*G \tag{1}$$

As it was mentioned earlier, the received optical power $P_r(\alpha,R)$ is in general inversely proportional to the square of the distance to the target. However, in practical EDM it may also depend on the parameters of the optical system due to, for example, saturation of incoming optical power at short distances due to the limited photodetector area. The dependence of $P_r$ on distance R is unique for each EDM, but often can be reduced to a $R^{-2}$ law at large enough distances. Since $\alpha$ and R in equation (1) are independent variables, equation (1) can be written as $$V_{ADC}(\alpha,R)=P_r(\alpha,R0)*\mathrm{cal}p(R)*G \tag{2}$$

where calp(R) is the power calibration function, R0 is the distance to target while the calibration function calp(R) is equal to 1.

The travel time of the optical pulse from the EDM to the target and back is t=2R/c, with c being the speed of light in the air. Substituting R into equation (2), we can rewrite equation (2) in the form $$V_{ADC}=V_{ADC}(\alpha,t)=P_r(\alpha,t0)*\mathrm{cal}p(t)*G \tag{3}$$

Normally, the conversion gain is fixed and all the variation in $P_r$ results in a respective variation of $V_{ADC}$. If we make the gain G dependent on the elapsed time since the optical pulse was emitted by the EDM, which is essentially the travel time t, equation (3) can be written as $$V_{ADC}(\alpha,t)=P_r(\alpha,t0)*\mathrm{cal}p(t)*G(t0)*\mathrm{cal}g(t) \tag{4}$$

where calg(t) is the conversion gain calibration function, G(t0) the conversion gain at the moment when calg(t) is equal to 1. Now, if we choose a calibration function calg(t) equal to the inverse of calp(t), calg(t)=1/calp(t), the voltage $V_{ADC}(\alpha,t)$ in (4) reduces to a function of the target albedo only:

$$V_{ADC}(\alpha,t)=V_{ADC}(\alpha,t0)=P_r(\alpha,t0)*G(t0) \tag{5}$$

That means the required dynamic range of the read-out electronics, or A/D converter, is in fact reduced by a factor of relative difference between the maximum and minimum values of the power calibration function calp(t).

The practical realization of introducing the calg(t) in the conversion gain may be done in different ways. The conversion gain of the receiver is in turn equal to $$G=\beta*Re*g, \tag{6}$$

where $\beta$ is the optical coupling factor to the photodetector including all the loss/amplification in the optical system, Re the responsivity of the photodetector, and g the total electrical gain/loss of the amplification chain from the photodetector to the read-out electronics. Any of the terms on the right side of equation (6), or a combination of them, may be dependent on the elapsed time:

$$G(t)=G(t0)*\mathrm{cal}g(t)=\beta(t0)*\mathrm{cal}b(t)*Re(t0)* \\ \mathrm{cal}r(t)*g(t0)*\mathrm{cal}amp(t). \tag{7}$$

Here, $\beta(t0)$, $Re(t0)$, $g(t0)$, $calb(t)$, $calr(t)$ and $calamp(t)$ are initial values and calibration functions for the optical coupling, responsivity, and electrical gain, respectively. In order to fulfil the condition (5), the multiple of the latter calibration functions should be equal to the inverse of the function $calp(t)$. For example, in case $calp(t)=t^{-2}$, the condition (5) can be realized at $calb(t)=calr(t)=1$ and $calamp(t)=t^2$. Another practical way is to chose $calb(t)$ and $calamp(t)$ equal to t, while leaving $calr(t)$ constant. Thus, an appropriate way for a particular EDM may be chosen for reducing the required dynamic range of read-out electronics, and, therefore, an effective increase in the overall dynamic range. In the present invention, the calibration functions are realized with help of control generators. We should also note that it is not necessary, though desirable, to get the function $calg(t)$ to exactly or substantially match the inverse of calibration function $1/calp(t)$. Even an approximate solution can be very effective. Besides that, divergency between $calg(t)$ and $1/calp(t)$ may be calibrated out in practical EDM.

The optical radiation source of the optical device may comprise a pulsed light source and/or a continuous-wave light source. In this way, the distance to a target from the device according to the second aspect of the present invention may be measured by a time-of-flight technique or a phase modulation technique.

The at least one control signal generator may for example comprise a function generator, such as a Direct Digital Synthesis (DDS) function generator, for generating control signals. Such function generators generally enable fine control of choice of output waveform, output amplitude, output frequency, frequency step, etc., thus providing flexible and versatile means with regards to control signal generation. Furthermore, such function generators may be programmed with relative ease. Such a DDS function generator may comprise an electronic controller, a random-access memory, a frequency reference (for example a crystal oscillator), a counter and a digital-to-analog converter (DAC).

Alternatively or optionally, the at least one control signal generator may comprise an analog control signal generator, whereby the need for components such as a DAC or a DDS may be eliminated.

According to an embodiment of the present invention, the elapsed time may be generated by measuring a travelling time of at least one optical pulse from the predetermined point in time, wherein the elapsed time comprises the travelling time.

Such a configuration may provide an alternative configuration for achieving the advantage(s) of the present invention as has been discussed in the foregoing.

Alternatively or optionally, the elapsed time may be generated (or the travelling time may be measured, cf. above) by sampling a signal, for example a signal corresponding to an optical pulse received at the receiver unit.

According to an embodiment of the present invention, the at least one parameter of the receiver unit may comprise the optical sensitivity of the receiver unit. The optical sensitivity may be the optical responsivity of, e.g., a photodetector unit, such as a photodiode, or a phototransistor, or a bolometer, or another photoelectric converter included in the receiver unit.

The photodetector may unit may be adapted to convert an optical signal, or optical pulse, to an electric signal. The at least one parameter of the receiver unit may comprise the responsivity, or sensitivity, or dynamic range, or any combination of those, of the photodetector unit.

According to another embodiment of the present invention, the receiver unit may be arranged to generate return signals, on the basis of, and corresponding to, the respective received optical pulses. The return signals may then be forwarded to digital processing equipment for digital processing. Also, the receiver unit may include one or more of a variable gain amplifier unit configured to amplify the return signals (e.g. amplify the voltage thereof) and a variable attenuator unit configured to attenuate the return signals (e.g. attenuate the voltage thereof). Typically, the receiver unit may include either a variable gain amplifier unit or a variable attenuator unit. In this case, the at least one parameter of the receiver unit may comprise one or more of the gain of the variable gain amplifier unit and the attenuation of the variable attenuator unit.

According to yet another embodiment of the present invention, the receiver unit includes a variable optical attenuator unit configured to attenuate the reflected optical pulses (e.g. attenuate the optical power thereof). In this case, the at least one parameter of the receiver unit may comprise the optical attenuation of the variable optical attenuator unit.

By the three configurations according to the three exemplary embodiments of the present invention described immediately above, either by taking each configuration alone or by any combination of the three configurations, there is provided a plurality of alternate solutions, each being capable of achieving the advantages of the present invention. In this way, the flexibility and versatility of the optical device according to the present invention may be increased, both with regards to operation thereof and with regards to the choice of components provided therein.

The variable optical attenuator unit may be selected from a group comprising a bulk crystal based optical attenuator, a fibre-optic attenuator and a fibre-optic electro-acoustic modulator, thus providing an increased flexibility of the optical device according to the present invention with regards to the choice of components provided therein.

According to yet another embodiment of the present invention, if the elapsed time exceeds a predetermined maximum elapsed time, the time-measuring unit may be reset.

In this manner, in case the elapsed time exceeds the predetermined maximum elapsed time, the current optical pulse may be rejected and instead the transmission of a new optical pulse is awaited. This may include stopping operation of the time-measuring unit. After emission of a new optical pulse from the optical radiation unit, the time-measuring unit may again start to generate the elapsed time from a point in time when the new optical pulse was emitted. The maximum elapsed time may for example be set to, or set on the basis of, a maximum possible measurable travel time of the optical pulse, according to trial-and-error testing, and/or according to machine specifications.

According to yet another embodiment of the present invention, the predetermined temporal function may substantially match or approximate an estimated function of the received optical power versus the elapsed time for the optical pulse, or substantially match or approximate an inverse of the estimated function.

By such a configuration, with reference to the exemplifying scenario described above, it is further ensured that the variation of a parameter of the receiver unit affecting the dynamic range of the receiver unit substantially conforms to the actual physical requirements of the receiver unit with regards to required width of dynamic range at the receiver unit.

According to yet another embodiment of the present invention, the predetermined temporal function may be configured such that the predetermined temporal function at least partly comprises a shape according to a step function, a polynomial, a linear function, a quadratic function, a rectangular function (also known as "rect function" or "boxcar function"), or any combination thereof. Other function shapes, for example an exponential decay function (or an exponentially growing function), may also be advantageous. This may be particularly useful, for example, if the received optical power versus the travelling time for the optical pulse is difficult to estimate. Such function shapes are relatively easy to implement and may provide flexibility and adaptability with regards to e.g. external conditions and/or user needs. An exponentially decaying (or growing) function shape may be relatively easily implemented digitally by means of an RC circuit, or RC link.

The predetermined temporal function may be configured such that it at least partly comprises a shape that is determined or adapted on the basis of different parameters of an optical system comprised in the optical device according to an embodiment of the present invention. Such an optical system may for example be configured to collimate the emitted optical pulses into a beam and for example comprise one or more of lens elements, prisms, wave guides, mirror elements, etc.

According to another exemplifying embodiment of the present invention, the temporal dependence of the at least one parameter of the receiver unit may be calibrated during or after manufacturing of the optical device according to the particular embodiment. In particular, the time dependence of the optical sensitivity of the receiver unit, e.g. the optical sensitivity of a photodetector unit comprised in the receiver unit, may be precisely calibrated during or after manufacturing of the optical device.

According to yet another embodiment of the present invention, the control signal generator unit may comprise a memory unit adapted to store data. The control signal generator unit may also be adapted to generate control signals by retrieving control signal values that have previously been stored in the memory unit.

The memory unit may for example comprise a flash memory. This enables, e.g., to reproduce measurements previously carried out in an exact manner and to store data values representing different predetermined temporal functions adapted to different measurement procedures, external conditions, user needs, etc., which data values may be retrieved from the memory unit at another occasion.

A distance measuring device comprising a continuous-wave light source may according to an exemplifying embodiment of the present invention be adapted such that the rate of change in the phase of a received modulated signal is faster than the rate of adjustment of the at least one parameter of the receiver unit affecting the dynamic range of the receiver unit.

According to an exemplifying embodiment of the present invention, the variable optical attenuator unit may include a gray wedge unit. The gray wedge unit may in turn comprise a rotatable gray wedge, arranged such that reflected optical pulses pass through the gray wedge and comprising a plurality of angular sectors, each angular sector having a predetermined transmission coefficient. The gray wedge unit may further comprise a motor, arranged for rotating the gray wedge, and a synchronization unit, adapted to synchronize the rotation speed of the gray wedge with a predetermined speed.

This provides yet another way of controlling the optical attenuation of the receiver unit, which way is flexible with regards to capacity requirements and relatively inexpensive with regards to cost of components. The more angular sectors there are comprised in the rotatable gray wedge, the less rotation speed of the gray wedge is required. For example, the required rotation speed of a gray wedge having N angular segments may be decreased N times compared to the required rotation speed of a gray wedge having only two angular segments.

According to another exemplifying embodiment of the present invention, the predetermined speed is equal to the rate of emission of optical pulses from the optical radiation source.

According to yet another exemplifying embodiment of the present invention, each angular sector of the rotatable gray wedge comprises a plurality of angular subsectors, arranged such that the transmission coefficient of each angular subsector varies monotonically in an angular direction with respect to the gray wedge.

By such a configuration, the smoothness of the response of the variable optical attenuator unit to the control signals may be improved.

Embodiments of the present invention are not limited to a gray wedge unit according to any one of the exemplifying configurations described in the foregoing, but the present invention rather encompasses embodiments comprising other types (implementations) of gray wedge units, having functions similar or identical to the functions of the exemplifying gray wedge unit configurations described in the foregoing.

Further objects and advantages of the present invention will be discussed below by means of exemplifying embodiments.

BRIEF DESCRIPTION OF THE DRAWINGS

Exemplifying embodiments of the invention will be described below with reference to the accompanying drawings, in which.

In the accompanying drawings, the same reference numerals denote the same or similar elements throughout the views.

DESCRIPTION OF EXEMPLIFYING EMBODIMENTS

The following is a description of exemplifying embodiments in accordance with the present invention. It is to be understood that the following description is non-limiting and for the purpose of describing the principles of the invention.

Figure 1:
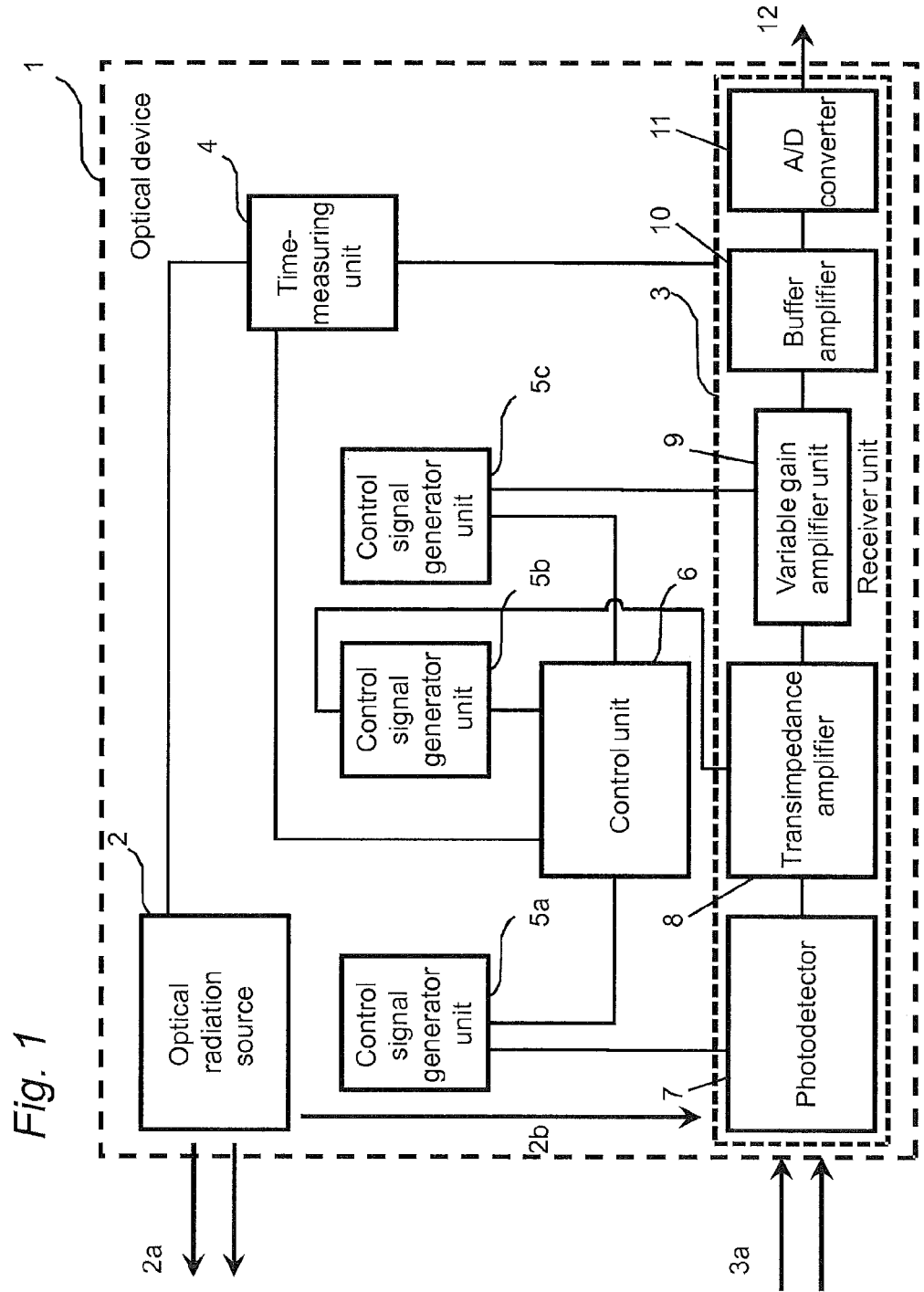
FIG. 1 is a schematic block diagram of an exemplifying embodiment of the present invention.

Referring to FIG. 1, there is shown a schematic block diagram of an optical device 1 according to an exemplifying embodiment of the present invention. The optical device 1 comprises an optical radiation source 2 adapted to emit optical pulses 2a. The optical pulses 2a are generally intended to propagate towards a target (not shown) at which the optical pulses are reflected and a portion of the thus reflected optical power is reflected back towards the optical device 1.

Such optical pulses 2a transmitted from the optical radiation source 2 may hence generally encompass electromagnetic radiation of any wavelength or within any wavelength range suitable for the particular application, for example microwave radiation and visible light. The optical radiation source 2 may comprise a pulsed light source or a continuous-wave light source, for example a diode laser, a master oscillator power amplifier (MOPA) or any other type of suitable radiation source. In the context of the present invention, by a MOPA it is meant a configuration comprising a master laser (or seed laser) and an optical amplifier adapted to boost the outputted optical power. Such an optical device 1 may for example be utilized in implementing distance measuring devices, surveying apparatuses, etc., as is further described with reference to exemplifying embodiments of the present invention in the following and in the foregoing.

At a receiver unit 3 reflected optical pulses 3a may be received, after which the received optical pulses 3a may for example be analysed and/or processed. For instance, the receiver unit 3 may be adapted to generate return signals corresponding to the thus received optical pulses 3a, which in turn may be digitally processed using suitable processing components for a number of applications.

With further reference to FIG. 1, the optical device 1 may further comprise a time-measuring unit 4 adapted to measure a travelling time of at least one optical pulse emitted from the optical radiation source 2. The time-measuring unit 4 may for example be adapted to perform analog, or digital, measurements. The travelling time may for example be measured from a point in time when the at least one optical pulse was emitted. The time-measuring unit 4 may be arranged integrally with the control unit 6. As indicated by the connection between the time-measuring unit 4 and the receiver unit 3, the travelling time of an optical pulse from the optical radiation source 2 may be measured on the basis of absolute time, i.e. by measuring the point in time at which the received optical pulse is received at the receiver unit 3. Alternatively or optionally, the travelling time may be measured on the basis of a time difference between the arrival time of an emitted optical reference pulse 2b that is guided, e.g. internally with respect to the optical device 1, to the receiver unit 3, and the arrival time of the received optical pulse from the target.

The optical device 1 may further comprise at least one control signal generator unit, wherein the exemplifying embodiment illustrated in FIG. 1 comprises three such control signal generator units 5a, 5b, 5c. Each of the control signal generators units 5a, 5b, 5c may be independently controlled by the control unit 6. Each of the control signal generators 5a, 5b, 5c is in general capable of generating output signals having a controlled output waveform, output amplitude, output frequency, etc. A control signal generator 5a, 5b, 5c may for example comprise a function generator, such as a DDS function generator, for generating control signals. Such function generators generally enable fine control of choice of output waveform, output amplitude, output frequency, frequency step, etc., thus providing flexible and versatile means with regards to control signal generation. Furthermore, such function generators may be programmed with relative ease. Such a DDS function generator may comprise an electronic controller, a random-access memory, a frequency reference (for example a crystal oscillator), a counter and a digital-to-analog converter (DAC). Alternatively or optionally, the control signal generator 5a, 5b, 5c may comprise an analog control signal generator.

With further reference to FIG. 1, the optical device 1 may further comprise a control unit 6 for controlling the optical device 1 in different respects. Some exemplifying ways of how the control unit 6 may be adapted to control the optical device 1 has already been described in the foregoing and is further described in the following. Although the appended drawings for simplicity only illustrate some exemplifying connections between the control unit 6 and other components of the optical device 1, each component of the optical device 1 may be independently controlled by means of the control unit 6. Furthermore, the state of different components of the optical device 1 may be independently monitored by means of the control unit 6. Each of the exemplifying connections implies two way communication, i.e. that communication may occur in both directions of the connection.

With further reference to FIG. 1, the optical device 1 may be operated as follows. As already mentioned, the optical radiation source 2 emits optical pulses 2a and the receiver unit 3 receives reflected optical pulses. For a particular optical pulse thus emitted from the optical radiation source 2, the time measuring unit 4 measures the travelling time from the point in time at which the optical pulse 2a was emitted from the optical radiation source 2. The time measuring unit 4 may be adapted to measure the travelling time at a predetermined measuring rate. One or more of the control signal generator units 5a, 5b, 5c may then be caused, e.g. by the control unit 6, to generate at least one control signal according to a predetermined temporal function on the basis of the travelling time. On the basis of the generated at least one control signal, the control unit 6 may then adjust at least one parameter of the receiver unit 3. The at least one parameter is such that it affects the dynamic range of the receiver unit 3.

The receiver unit 3 may be adapted to generate return signals corresponding to the received reflected optical pulses 3a, the return signals being for example intended for subsequent digital processing. For this purpose, the receiver unit 3 may for example comprise a photodetector 7.

According to the exemplifying embodiment illustrated in FIG. 1, each of the control signal generator units 5a, 5b, 5c may be caused by the control unit 6 to generate at least one control signal according to a predetermined temporal function on the basis of the travelling time. The temporal functions used to generate the at least one control signal of each control signal generator unit 5a, 5b, 5c may in general be different from each other. In this way, several parameters affecting the dynamic range of the receiver unit 3 may be adjusted on the basis of the thus generated control signals. As illustrated in FIG. 1, the receiver unit 3 may comprise a photodetector 7, a transimpedance amplifier 8 (i.e. an amplifier that takes current as input and outputs voltage) and a variable gain amplifier unit 9 configured to amplify electrical (return) signals, each of which components thus may be controlled or adjusted on the basis of the thus generated control signals such as to adjust the total dynamic range of the receiver unit 3. In this way, there is provided a highly flexible manner in which the one or more parameters of the receiver unit 3 may be adjusted, and thus a highly flexible manner in which the dynamic range of the receiver unit 3 may be controlled or adjusted.

Now, consider a first case of a single control signal that is generated according to a predetermined temporal function $F_1$ on the basis of the elapsed time, e.g. the travelling time of an optical pulse. On the basis of the generated single control signal, the control unit may then adjust at least one parameter of the receiver unit (e.g. adjust a parameter of one component of the receiver unit, such as a variable gain amplifier). Next, consider a second case where M control signals are generated, on the basis of which M control signals parameters of respective (in general different) components of the receiver unit may be adjusted. The temporal functions $F_2 \ldots F_{M+1}$ by means of which the control signals are generated may in this case be adapted such that the combined (e.g. integrated) effect of the adjustment of the receiver unit is substantially the same as in the first case. For example, if $F_1$ comprises a quadratic function and M=2, $F_2$ and $F_3$ may for example each comprise a linear function, (cf. the discussion in the foregoing with respect to equations (1)-(7)).

As also illustrated in FIG. 1, the receiver unit 3 may further comprise a buffer amplifier 10 (providing electric impedance transformation from its input to its output) and an A/D converter 11. The components 7, 8, 9, 10, 11 of the receiver unit 3 are according to the illustrated exemplifying embodiment of the present invention arranged in series. The order of the receiver unit 3 components 7, 8, 9, 10, 11 in this series is not limited to the one shown in FIG. 1 but the order of the receiver unit 3 components 7, 8, 9, 10, 11 may in general be adjusted according to, e.g., user needs. The signal(s) 12 outputted from the receiver unit 3 may be supplied to other components for further analysis and/or processing.

As already indicated, it is to be understood that FIG. 1 and other appended drawings are schematic, and thus the relative positions of the components of the optical device 1 within the optical device 1 are shown by way of example and are not to be considering as limiting the present invention. For example, the position of the optical radiation source 2 relative the receiver unit 3, or vice versa, is not limited to the examples shown in the appended drawings.

The optical device 1 may further include an optical system (not shown) configured to, e.g., collimate the emitted optical pulses 2a into a beam, the optical system comprising, e.g., one or more lens elements, prisms, wave guides, mirror elements, etc. However, as important as such components may be, such an optical system is not critical to the implementation of the present invention as such and detailed description thereof is therefore omitted. Nevertheless, as have already been discussed in the foregoing, various parameters of such an optical system may constitute a basis for determining or adapting a shape of a predetermined temporal function, on the basis of which predetermined temporal function one or more controls signals are generated by the control signal generator unit 5a, 5b, 5c.

Figure 2:
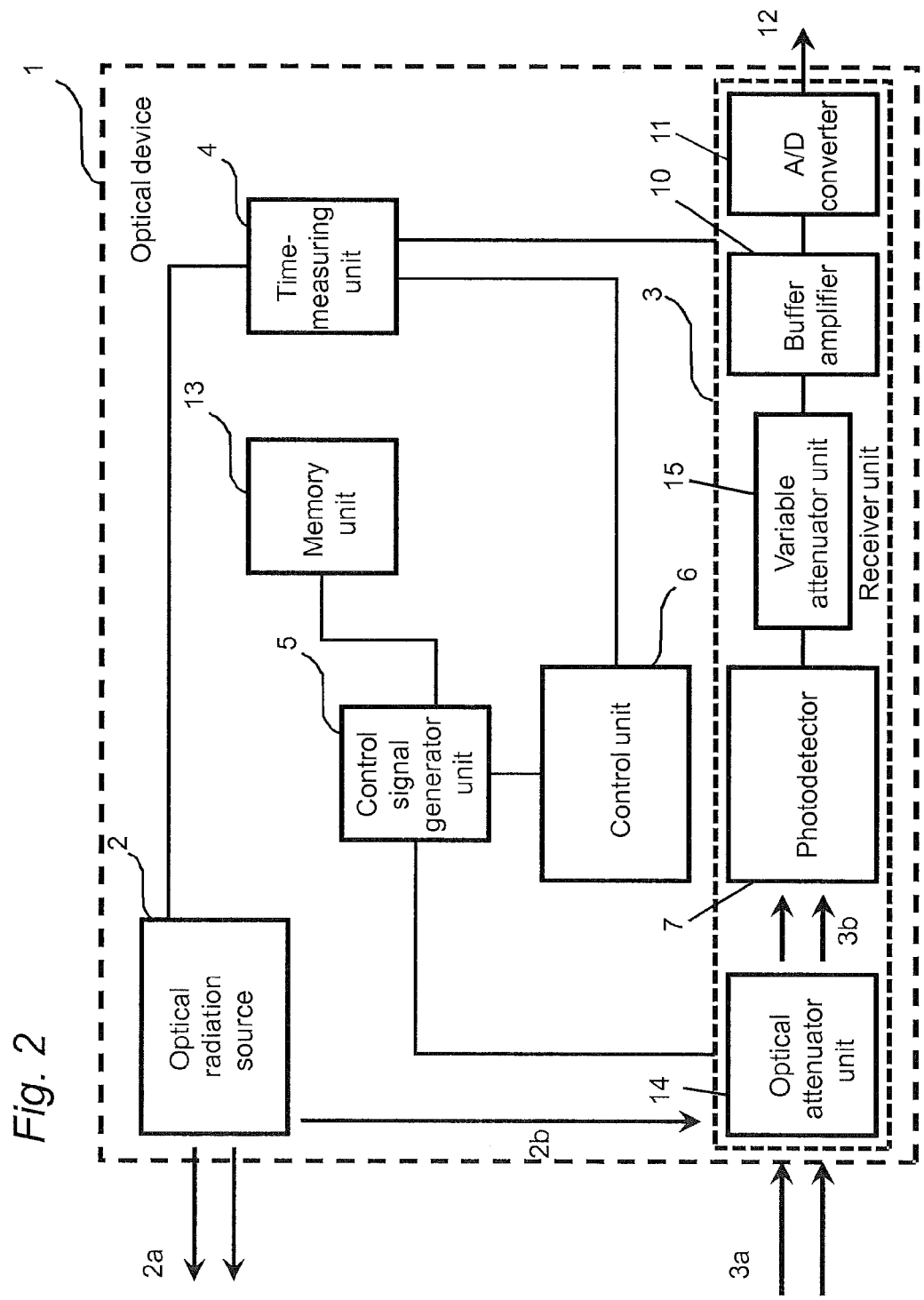
FIG. 2 is a schematic block diagram of another exemplifying embodiment of the present invention.

Referring now to FIG. 2, there is shown a schematic block diagram of an optical device 1 according to another exemplifying embodiment of the present invention. The optical device 1 depicted in FIG. 2 comprises components similar to or the same as components comprised in the optical device 1 described with reference to FIG. 1. The description of such similar or identical components with reference to FIG. 2 is therefore omitted. With reference to FIG. 2, in contrast to the optical device 1 described with reference to FIG. 1, the optical device 1 comprises a single control signal generator unit 5 adapted to generate control signals, which control signal generator unit 5 may be controlled by the control unit 6, in accordance with the embodiment of the present invention depicted in FIG. 2. As illustrated in FIG. 2, the optical device 1 may comprise a memory unit 13 adapted to store data. The control signal generator unit 5 may be adapted to generate control signals by retrieving control signal values that were previously stored in the memory unit 13. The memory unit 13 may for example comprise a flash memory or another type of non-volatile memory such as a ROM. Alternatively, the memory unit 13 may be arranged integral with the control signal generator 5. In contrast to the receiver unit 3 described with reference to FIG. 1, the receiver unit 2 described with reference to FIG. 2 comprises a variable optical attenuator unit 14 that may have a momentarily varied optical attenuation, which optical attenuator unit 14 is configured to attenuate the received reflected optical pulses 3a, thus producing attenuated optical pulses 3b, and a variable attenuator unit 15, configured to attenuate electrical (return) signals that, as already mentioned above, may be generated by the photodetector 7 from optical pulses inputted to the photodetector 7. As schematically illustrated in FIG. 2, the control signal generator unit 5 may be connected to the receiver unit 3, meaning that the control signal generator unit 5 may be connected to any of the components comprised in the receiver unit 3. Accordingly, the control signal generator unit 5 may be adapted to generate control signals by which any of the components of the receiver unit 3 may be controlled or adjusted on the basis of the thus generated control signals, such as to adjust the total dynamic range of the receiver unit 3.

Figure 3:
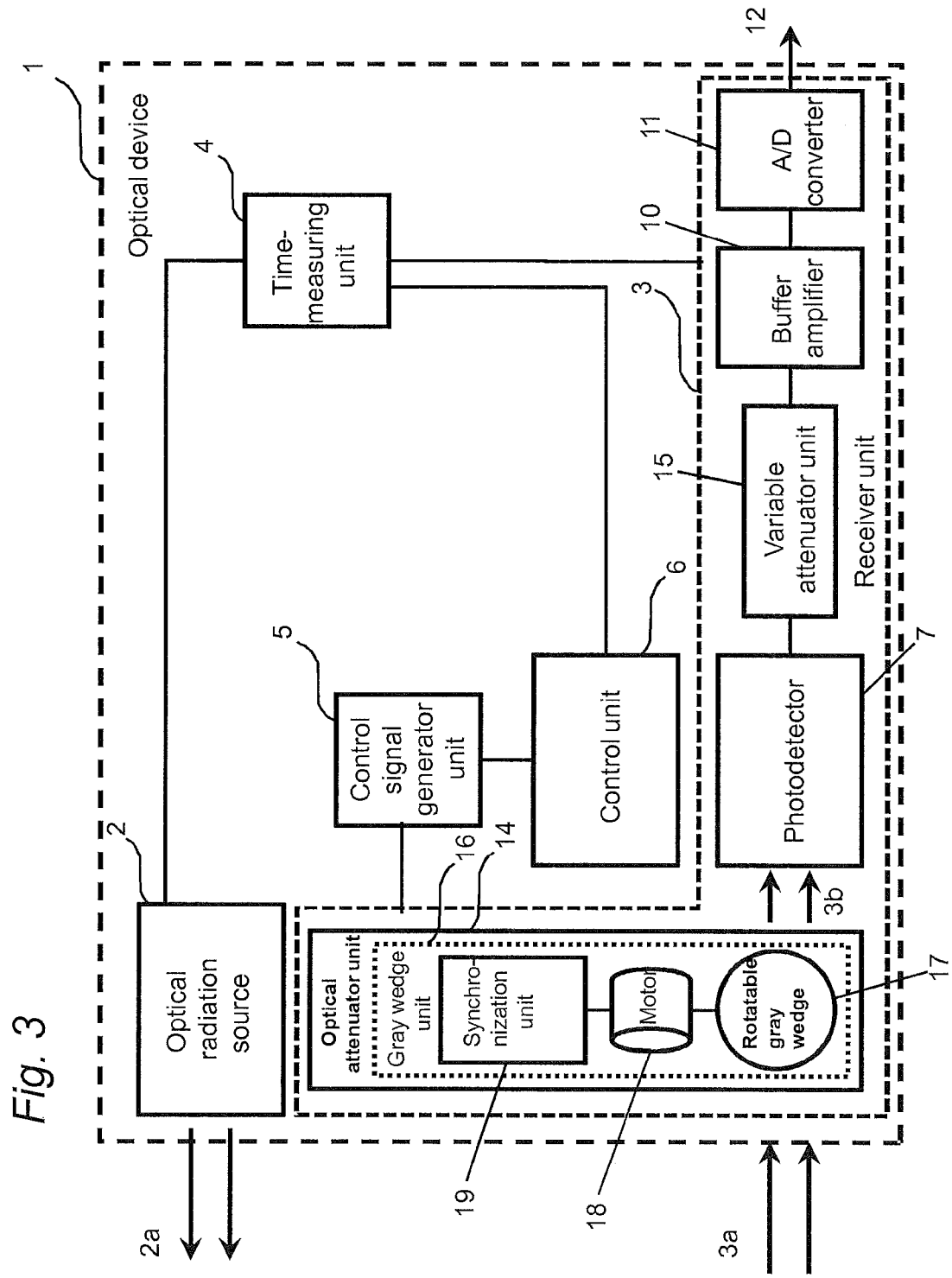
FIG. 3 is a schematic block diagram of yet another exemplifying embodiment of the present invention.

Referring now to FIG. 3, there is shown a schematic block diagram of an optical device 1 according to yet another exemplifying embodiment of the present invention. The optical device 1 depicted in FIG. 3 comprises components similar to or the same as components comprised in the optical device 1 described with reference to FIGS. 1 and/or 2. The description of such similar or identical components with reference to FIG. 3 is therefore omitted. With reference to FIG. 3, in contrast to the optical device(s) 1 described with reference to FIGS. 1 and/or 2, the receiver unit 3 of the optical device 1 may comprise a variable optical attenuator unit 14 including, or being, a gray wedge unit 16, which in turn may comprise a rotatable gray wedge 17, arranged such that reflected optical pulses 3a at the receiver unit 3 may pass through the rotatable gray wedge 17 before reaching any other components of the receiver unit 3. The rotatable gray wedge 17 may comprise a plurality of angular sectors, each angular sector having a predetermined transmission coefficient.

With further reference to FIG. 3, the control signal generator unit 5 may be connected to the receiver unit 3 (meaning that the control signal generator unit 5 may be connected to any of the components comprised in the receiver unit 3, such as the optical attenuator unit 14). Accordingly, the control signal generator unit 5 may be adapted to generate control signals by which any of the components of the receiver unit 3 may be controlled or adjusted on the basis of the thus generated control signals, such as to adjust the total dynamic range of the receiver unit 3.

Figure 4:
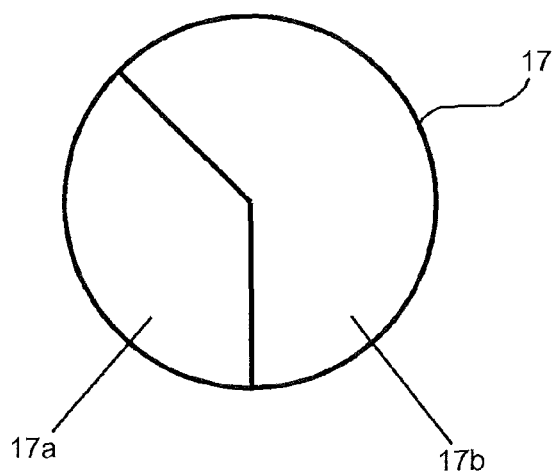
FIG. 4 is schematic view illustrating an exemplifying embodiment of the present invention.

Referring now to FIG. 4, there is shown a schematic illustration of a rotatable gray wedge 17 according to an exemplifying embodiment of the present invention, wherein the rotatable gray wedge 17 comprises two angular sectors 17a, 17b. In general, the angular sectors 17a, 17b may have different coefficients of transmission. Although the exemplifying gray wedge 17 depicted in FIG. 4 only comprises two angular sectors, the present invention encompasses embodiments comprising an arbitrary number n of angular sectors, with n=1, 2, 3, 4, 5, . . . .

Referring now again to FIG. 3, the gray wedge unit 16 may further comprise a motor 18 arranged for rotating the gray wedge 17. The gray wedge unit 16 may further comprise a synchronization unit 19 adapted to synchronize the speed of rotation of the gray wedge 17 with a predetermined speed. This predetermined speed may be equal to the rate of emission of optical pulses 2a from the optical radiation source 2.

The more angular sectors there are comprised in the rotatable gray wedge 17, the less rotation speed of the gray wedge 17 is required. For example, the rotation speed of a gray wedge 17 having N angular segments may be decreased N times compared to the required rotation speed of a gray wedge 17 having only two angular segments in accordance with the exemplary embodiment of the present invention described with reference to FIG. 4.

Each angular sector 17a, 17b of the rotatable gray wedge 17 may comprise a plurality of angular subsectors (not shown), arranged such that the transmission coefficient of each angular subsector varies monotonically in an angular direction with respect to the gray wedge 17. In this way, the smoothness of the response of the variable optical attenuator unit 16 to the control signals may be improved.

Figure 5:
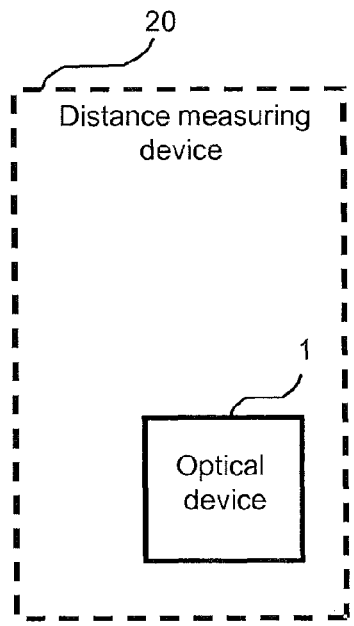
FIG. 5 is a schematic block diagram of an exemplifying embodiment of the present invention.

Referring now to FIG. 5, there is shown a schematic block diagram of a distance measuring device 20 according to an exemplifying embodiment of the present invention. The distance measuring device 20 comprises an optical device 1, a few examples of which have been described herein. The distance measuring device 20 may comprise an optical device 1 according to any embodiment of the present invention as described herein and as defined by the appended claims.

Figure 6:
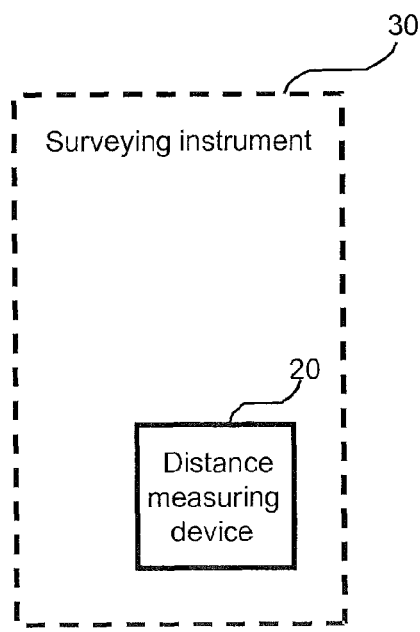
FIG. 6 is a schematic block diagram of another exemplifying embodiment of the present invention.

Referring now to FIG. 6, there is shown a schematic block diagram of a surveying instrument 30 according to an exemplifying embodiment of the present invention. The distance measuring device 30 comprises a distance measuring device 20 such as described with reference to FIG. 5. The surveying instrument 30 may comprise a distance measuring device 20 according to any embodiment of the present invention as described herein and as defined by the appended claims.

Figure 7:
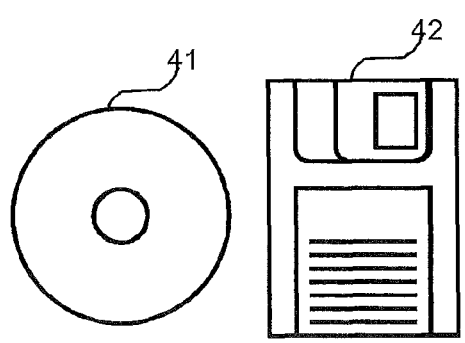
FIG. 7 is a schematic view of exemplifying embodiments of the present invention.

Referring now to FIG. 7, there is shown schematic views of computer readable digital storage mediums 41, 42 according to exemplifying embodiments of the present invention, comprising a DVD 41 and a floppy disk 42 on each of which there may be stored a computer program comprising computer code adapted to perform, when executed in a processor unit a method according to the present invention or embodiments thereof, as has been described in the foregoing. Although only two different types of computer-readable digital storage mediums have been described above with reference to FIG. 7, the present invention encompasses embodiments employing any other suitable type of computer-readable digital storage medium, such as, but not limited to, a hard disk drive, a CD, a flash memory, magnetic tape, a USB stick, a Zip drive, etc.

A computer program product comprising computer code adapted to perform, when executed in a processor unit, a method according to the present invention or any embodiment thereof may be stored on a computer (e.g. a server) adapted to be in communication with an optical device, a distance measuring device or a surveying instrument according to an exemplifying embodiment of the present invention. In this manner, when loaded into and executed in a processor unit of the computer, the computer program may perform the method. Such a configuration eliminates the need to store the computer program locally at the optical device, the distance measuring device or the surveying instrument. The communication between the computer and the optical device, the distance measuring device or the surveying instrument may be implemented in a wired fashion (e.g. by means of Ethernet) or in a non-wired fashion (e.g. by means of wireless infra-red (IR) communications or other wireless optical communications, or by means of wireless radiowave communications such as Global Positioning System (GPS)).

In conclusion, it is disclosed an optical device that may be employed in a distance measuring device, the optical device comprising a control unit that may be adapted to cause at least one control signal generator unit to generate at least one control signal according to a predetermined temporal function on the basis of an elapsed time from a predetermined point in time. On the basis of the generated at least one control signal, at least one parameter of a receiver unit may be adjusted during the travel time of the optical pulse, wherein the at least one parameter affects the dynamic range of the receiver unit. In this manner, the dynamic range of the receiver unit may be increased. It is further disclosed a method for operating such an optical device, a distance measuring device comprising such an optical device and a surveying instrument comprising such a distance measuring device.

Although exemplary embodiments of the present invention has been described herein, it should be apparent to those having ordinary skill in the art that a number of change, modifications or alterations to the invention as described herein may be made. Thus, the above description of the invention and the accompanying drawings are to be regarded as non-limiting examples of the invention and the scope of protection is defined by the appended claims.

The invention claimed is:

1. An optical device including:
   an optical radiation source configured to emit optical pulses;
   a receiver unit configured to receive reflected optical pulses;
   a time-measuring unit configured to generate an elapsed time from a point in time related to emission of an optical pulse from the optical radiation source;
   at least one control signal generator unit configured to generate at least one control signal being proportional to the elapsed time; and
   a control unit configured to adjust, during a travel time of the emitted optical pulse from the optical device to a target and back, at least one parameter of the receiver unit affecting the dynamic range of the receiver unit based on the generated at least one control signal.

2. The optical device of claim 1, wherein the at least one control signal generator unit is configured to generate the least one control signal according to at least one of an attenuation function depending on the elapsed time and a gain function depending on the elapsed time.

3. The optical device of claim 2, wherein said at least one of the attenuation function and the gain function matches or approximates at least one of an estimated function of a received optical power versus the elapsed time for the emitted optical pulse and an inverse of said estimated function.

4. The optical device of claim 2, wherein said at least one of the attenuation function and the gain function at least partly is at least one of a step function, a polynomial function, a linear function, a quadratic function, a rectangular function and an exponentially decaying function.

5. The optical device of claim 1, wherein the control unit is configured to set said at least one parameter of said receiver unit to a first value at said point in time and then, as the elapsed time increases, adjust said at least one parameter temporarily on the basis of the generated at least one control signal.

6. The optical device of claim 1, wherein said point in time is a point in time when the optical pulse is emitted or a point in time when an optical reference pulse is received at the receiver unit, said optical reference pulse being emitted concurrently with or in connection to emission of the optical pulse from the optical radiation source.

7. The optical device of claim 1, wherein the control unit is configured to adjust said at least one parameter until another pulse is emitted from the optical radiation source.

8. The optical device of claim 1, wherein said at least one parameter of said receiver unit includes the optical responsivity of a photodetector unit of said receiver unit.

9. The optical device of claim 1, wherein the receiver unit is further configured to generate return signals corresponding to the received optical pulses for digital processing, and the receiver unit includes at least one of:
   a variable gain amplifier unit configured to amplify the return signals, wherein said at least one parameter includes the gain of said variable gain amplifier unit; and
   a variable attenuator unit configured to attenuate the return signals, wherein said at least one parameter includes the attenuation of said variable attenuator unit.

10. The optical device of claim 1, wherein the receiver unit includes:

a variable optical attenuator unit configured to attenuate said reflected optical pulses;

wherein said at least one parameter of said receiver unit includes the optical attenuation of said variable optical attenuator unit.

11. The optical device of claim 1, wherein said control unit is further configured to, if the elapsed time exceeds a maximum elapsed time, reset said time-measuring unit.

12. The optical device of claim 1, wherein the control signal generator unit includes a memory unit configured to store data, and wherein the control signal generator unit is configured to generate control signals by retrieving control signal values previously stored in the memory unit.

13. An optical device including:
an optical radiation source configured to emit optical pulses;
a receiver unit configured to receive reflected optical pulses; and
a control unit configured to adjust as a function of time, for an optical pulse emitted from the optical radiation source, at least one parameter affecting the dynamic range of the receiver unit, the control unit being configured to adjust the at least one parameter during a travel time of the emitted optical pulse from the optical device to a target and back to the receiver unit and based on at least one control signal generated proportional to an elapsed time related to emission of the optical pulse.

14. The optical device of claim 13, wherein said at least one parameter is at least one of an attenuation level of an attenuator of the receiving unit and a gain of an amplifier of the receiving unit.

15. The optical device of claim 13, wherein the control unit is configured to adjust said at least one parameter until another optical pulse is emitted from the optical radiation source or until a time elapsed since emission of the optical pulse exceeds a maximum value.

16. The optical device of claim 13, wherein the control unit is configured to set said at least one parameter of said receiver unit to a first value at the instant the optical pulse is emitted from the optical radiation source or after the optical pulse has been emitted from the optical radiation source and then adjust said at least one parameter temporarily to other values as a function of time.

17. The optical device of claim 13, further comprising at least one signal generator configured to generate said at least one control signal and transmit said at least one control signal to the control unit for adjusting said at least one parameter.

18. The optical device of claim 17, wherein said temporal function is at least partly inversely proportional to the square of the travel time.

19. The optical device of claim 17, wherein said temporal function matches or approximates at least one of an estimated function of a received optical power for the emitted optical pulse versus a time elapsed since emission of the optical pulse and an inverse of said estimated function.

20. A distance measuring device including:
an optical device, and
a processing unit configured to determine a distance to a target from said distance measuring device on the basis of a comparison between the transmitted optical pulse and a received optical pulse,
wherein said optical device includes:
an optical radiation source configured to emit optical pulses;
a receiver unit configured to receive reflected optical pulses; and
a control unit configured to adjust as a function of time, for an optical pulse emitted from the optical radiation source, at least one parameter affecting the dynamic range of the receiver unit, the control unit being configured to adjust the at least one parameter during a travel time of the emitted optical pulse from the optical device to a target and back to the receiver unit and based on at least one control signal generated proportional to an elapsed time related to emission of the optical pulse.

* * * * *